United States Patent
Li et al.

(10) Patent No.: US 10,809,394 B2
(45) Date of Patent: Oct. 20, 2020

(54) DUAL-ENERGY DETECTION APPARATUS AND METHOD THEREOF

(71) Applicant: Nuctech Company Limited, Beijing (CN)

(72) Inventors: Shuwei Li, Beijing (CN); Qingjun Zhang, Beijing (CN); Xiang Zou, Beijing (CN); Bozhen Zhao, Beijing (CN); Junxiao Wang, Beijing (CN); Weibin Zhu, Beijing (CN); Yongqiang Wang, Beijing (CN); Wenjian Zhang, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 0 days.

(21) Appl. No.: 16/365,910

(22) Filed: Mar. 27, 2019

(65) Prior Publication Data

US 2019/0302281 A1    Oct. 3, 2019

(30) Foreign Application Priority Data

Mar. 28, 2018   (CN) .......................... 2018 1 0262091

(51) Int. Cl.
  *G01T 1/20*    (2006.01)
  *G01B 15/02*   (2006.01)
  (Continued)

(52) U.S. Cl.
  CPC ............ *G01T 1/2018* (2013.01); *G01B 15/02* (2013.01); *G01N 23/04* (2013.01); *G01T 1/22* (2013.01); *G01T 1/248* (2013.01); *G01V 5/0041* (2013.01)

(58) Field of Classification Search
  CPC ...... G01B 15/02; G01B 15/025; G01N 23/04; G01N 23/087; G01N 2223/04;
  (Continued)

(56) References Cited

U.S. PATENT DOCUMENTS

| 2011/0163236 A1* | 7/2011 | Arodzero ............... G01N 23/04 250/361 R |
| 2012/0093289 A1 | 4/2012 | Arodzero et al. |
| 2015/0338545 A1 | 11/2015 | Arodzero et al. |

FOREIGN PATENT DOCUMENTS

| CN | 101629917 A | 1/2010 |
| JP | S57-86028 A | 5/1982 |

(Continued)

OTHER PUBLICATIONS

Extended European Search Report dated Jul. 17, 2019 received in European Application No. 19 16 5566.1.

*Primary Examiner* — Mark R Gaworecki
(74) *Attorney, Agent, or Firm* — Scully Scott Murphy & Presser (57) ABSTRACT

The present disclosure provides a dual-energy detection apparatus and method. The dual-energy detection apparatus includes an X-ray source configured to send a first X-ray beam to an object to be measured; a scintillation detector configured to work in an integration mode, and receive a second X-ray beam penetrating through the object to be measured to generate a first electrical signal; a Cherenkov detector configured to be located behind the scintillation detector, work in a counting mode, and receive a third X-ray beam penetrating through the scintillation detector to generate a second electrical signal; and a processor configured to output image, thickness and material information of the object to be measured according to the first electrical signal and the second electrical signal. The dual-energy detection method provided by the present disclosure may acquire an image of the object to be measured that is clearer and contains more information.

13 Claims, 10 Drawing Sheets (51) Int. Cl.
  *G01N 23/04* (2018.01)
  *G01T 1/22* (2006.01)
  *G01T 1/24* (2006.01)
  *G01V 5/00* (2006.01)

(58) Field of Classification Search
  CPC ..... G01N 2223/1016; G01N 2223/501; G01N 2223/5055; G01N 2223/60; G01N 2223/633; G01T 1/2018; G01T 1/22; G01T 1/248; G01V 5/0041
  See application file for complete search history.

(56) References Cited

FOREIGN PATENT DOCUMENTS

| | | |
|---|---|---|
| JP | 2015-021913 A | 2/2015 |
| WO | 2011/071759 A2 | 6/2011 |

\* cited by examiner

S602
Receiving the first electrical signal generated by the scintillation detector working in the integration mode based on the second X-ray beam S604
Receiving the second electrical signal generated by the Cherenkov detector working in the counting mode based on the third X-ray beam S606
Acquire the image, thickness and material information of the object to be measured according to the first electrical signal and the second electrical signal

Acquire the energy spectrum of the third X-ray beam according to the second electrical signal

S704

Acquire the first integration of the first preset interval of the energy spectrum and the second integration of the second preset interval of the energy spectrum

S706

Acquire the thickness and material information of the object to be measured according to the first integration and the second integration

DUAL-ENERGY DETECTION APPARATUS AND METHOD THEREOF

CROSS-REFERENCE TO RELATED APPLICATIONS

This application is based upon and claims priority to Chinese Patent Application No. 201810262091.4, filed on Mar. 28, 2018, the entire content of which are incorporated herein by reference.

TECHNICAL FIELD

The present disclosure relates to the field of radiation detection technology, and particularly to a dual-energy detection apparatus and a dual-energy detection method thereof.

BACKGROUND

In the megavolt-level X-ray inspection system, acquiring clearer images and more material composition information is an important technological development direction.

At present, in the field of X-ray inspection, the mainstream method for acquiring information of an object to be measured is realized by dual-energy X-ray. Typically, a dual-energy accelerator is used, which generates X-ray beams of different energies by alternately using electron beams of different energies. By analyzing these two sets of signals, the effective atomic number information of the object to be measured is acquired. However, this method has much requirement for the energy stability of the electron accelerator. At the same time, because of the constant movement of the object to be measured, the signals acquired by the X-ray beams of high and low energy are actually signals of the X-ray beams of different positions of the object to be measured, which leads to distortion in identification effect. In addition, the average attenuation coefficient of low-energy X-ray beams is large, that is, its penetration ability is poor, which restricts the penetration index and material identification effect of the whole image.

Another method is to use a method of energy spectrum measurement. That is, the photon energy of each X-ray in the incident X-ray beams is measured (hereinafter collectively referred to as "counting mode"). This method has very high requirements for the time response speed of the entire detector (hereinafter collectively referred to as "acquisition time") and the speed of subsequent readout circuits. Otherwise, the incident X-ray density will be constrained, thereby resulting in a large deviation. For example, if each acquisition time is too long, and there are exactly two low-energy X-ray photons that are incident into the sensitive volume of the detector during this time, the two low-energy X-ray photons may be identified to be one high-energy X-ray photon. Therefore this method can only work at low ray intensities. Although this method may improve the material identification effect, it is only suitable for low-intensity X-ray beams.

In the Chinese invention patent CN101629917A, a dual-energy detection apparatus is disclosed, which can overcome the above problems to some extent. However, in this disclosure, the two detectors need to work in conjunction. In use, it needs to be debugged with the present system, and their parameters need to be adjusted between the two detectors, which is inconvenient to use, and the output image quality thereof needs to be improved. Moreover, limited to the technical level at that time, the detectors used in this disclosure all adopt the integration mode.

It should be noted that, the above information disclosed in the background section is only for enhancing the understanding of the background of the present disclosure, and thus may include information that does not constitute prior art known to those of ordinary skills in the art.

SUMMARY

An object of the present disclosure is to provide a dual-energy detection apparatus and a dual-energy detection method, at least to some extent, to overcome the problem of inconvenient use of dual-energy detector and of lack of clarity of image quality in related art.

According to the first aspect of the present disclosure, a dual-energy detection apparatus is provided, which includes:

an X-ray source, configured to send a first X-ray beam to an object to be measured;

a scintillation detector, configured to work in an integration mode, and receive a second X-ray beam penetrating through the object to be measured to generate a first electrical signal;

a Cherenkov detector, configured to be located behind the scintillation detector, work in a counting mode, and receive a third X-ray beam penetrating through the scintillation detector to generate a second electrical signal with; and a processor, configured to output image, thickness and material information of the object to be measured according to the first electrical signal and the second electrical signal.

In some embodiments, the scintillation detector includes:

a scintillator;

a photosensitive device; and a data readout circuit, configured to work in the integration mode, and output the first electrical signal including the image information of the object to be measured.

In some embodiments, the Cherenkov detector includes:

a Cherenkov radiator;

a photomultiplier device; and a fast readout circuit, configure to work in the counting mode, and output the second electrical signal including the image, thickness and material information of the object to be measured.

In some embodiments, the processor acquires the image of the object to be measured based on the first electrical signal and the second electrical signal, and acquires the thickness and material information of the object to be measured based on the second electrical signal.

In some embodiments, the fast readout circuit is configured to receive the third X-ray beam and acquire an energy spectrum of the third X-ray beam, acquire a first integration of a first preset interval of the energy spectrum and a second integration of a second preset interval of the energy spectrum, and acquire the thickness and material information of the object to be measured according to the first integration and the second integration.

In some embodiments, the photomultiplier device includes a photomultiplier tube or a silicon photomultiplier tube.

According to the second aspect of the present disclosure, a dual-energy detection method is provided, which includes:

receiving a first electrical signal generated by a scintillation detector working in an integration mode based on a second X-ray beam, wherein the second X-ray beam is formed by a first X-ray beam penetrating through an object to be measured;

receiving a second electrical signal generated by a Cherenkov detector working in a counting mode based on a third X-ray beam, wherein the Cherenkov detector is located behind the scintillation detector, and the third X-ray beam is formed by the second X-ray beam penetrating through the scintillation detector; and acquiring image, thickness and material information of the object to be measured according to the first electrical signal and the second electrical signal.

In some embodiments, the first electrical signal includes the image information of the object to be measured, and the second electrical signal includes the image, thickness and material information of the object to be measured.

In some embodiments, the step of acquiring image, thickness and material information of the object to be measured according to the first electrical signal and the second electrical signal includes:

acquiring the image information of the object to be measured based on the first electrical signal and the second electrical signal; and acquiring the thickness and material information of the object to be measured based on the second electrical signal.

In some embodiments, the step of acquiring the thickness and material information of the object to be measured based on the second electrical signal includes:

acquiring an energy spectrum of the third X-ray beam according to the second electrical signal;

acquiring a first integration of a first preset interval of the energy spectrum and a second integration of a second preset interval of the energy spectrum; and acquiring the thickness and material information of the object to be measured according to the first integration and the second integration.

According to the third aspect of the present disclosure, a dual-energy detection apparatus is provided, which includes:

a first electrical signal receiving module, configured to receive a first electrical signal generated by a scintillation detector working in an integration mode based on a second X-ray beam, wherein the second X-ray beam is formed by a first X-ray beam penetrating through an object to be measured;

a second electrical signal receiving module, configured to receive a second electrical signal generated by a Cherenkov detector working in a counting mode based on a third X-ray beam, wherein the Cherenkov detector is located behind the scintillation detector, and the third X-ray beam is formed by the second X-ray beam penetrating through the scintillation detector; and a dual-signal processing module, configured to acquire image, thickness and material information of the object to be measured according to the first electrical signal and the second electrical signal.

According to the fourth aspect of the present disclosure, an electronic device is provided, which includes:

a memory; and a processor, configured to be coupled to the memory, and execute the above methods based on instructions stored in the memory.

According to the fifth aspect of the present disclosure, a computer readable storage medium is provided, on which a program is stored, and when the program is executed by a processor, the above dual-energy detection methods are realized.

The dual-energy detection apparatus and method provided by the present disclosure, by processing output signals of the separately-working scintillation detector and the separately-working Cherenkov detector located behind the scintillation detector during X-ray detection, can obtain an image that is clearer and contains more information of the object to be measured object. In addition, by making the two detectors work separately, it can be seamlessly integrated with the existing system, without adjusting the two detectors to coordinate their parameters, thereby reducing the difficulty of use and improving the X-ray detection effect.

The two detectors can work separately, and can perform further data integration so as to provide more accurate information of the object to be measured.

It shall be appreciated that the above general description and the following detailed description are merely exemplary and explanatory and shall not limit the present disclosure.

BRIEF DESCRIPTION OF THE DRAWINGS

The accompanying drawings herein are incorporated into the specification and constitute part of this specification, showing embodiments consistent with the present disclosure, and used together with the specification to explain the principles of the present disclosure. It is apparent that, the drawings in the following description are only some of the embodiments of the present disclosure, and from these drawings, other drawings may be acquired by those of ordinary skills in the art without paying out inventive labors.

DETAILED DESCRIPTION

Exemplary embodiments will now be described more fully with reference to the accompanying drawings. However, the exemplary embodiments may be implemented in a variety of forms, and should not be construed as being limited to the embodiments set forth herein. Rather, these embodiments are provided so that this disclosure will be thorough and complete, and the concept of the exemplary embodiments can be fully conveyed to those skilled in the art. Furthermore, the described features, structures or characteristics may be combined in any suitable manner in one or more embodiments. In the following description, numerous specific details are set forth to provide a thorough understanding of the embodiments of the disclosure. However, those skilled in the art will appreciate that the technical solution of the present disclosure may be practiced without one or more of the specific details, or other methods, components, materials, devices, steps, etc. can be used. In other instances, well-known structures, methods, devices, implementations, materials or operations are not shown or described in detail to avoid obscuring aspects of the present disclosure.

In addition, the drawings are only schematic illustrations of the present disclosure. The same reference numerals in the drawings denote the same or similar structures, and thus their detailed description will be omitted. The block diagrams shown in the figures are merely functional entities and do not necessarily have to correspond to physical or logical separate entities. That is, these functional entities may be implemented in software, or these functional entities or a part of them may be implemented in one or more modules hardened from software, or these functional entities may be implemented in different network and/or processor devices and/or microcontroller devices.

Exemplary embodiments of the present disclosure will be described in detail blow with reference to the accompanying drawings.

Figure 1:
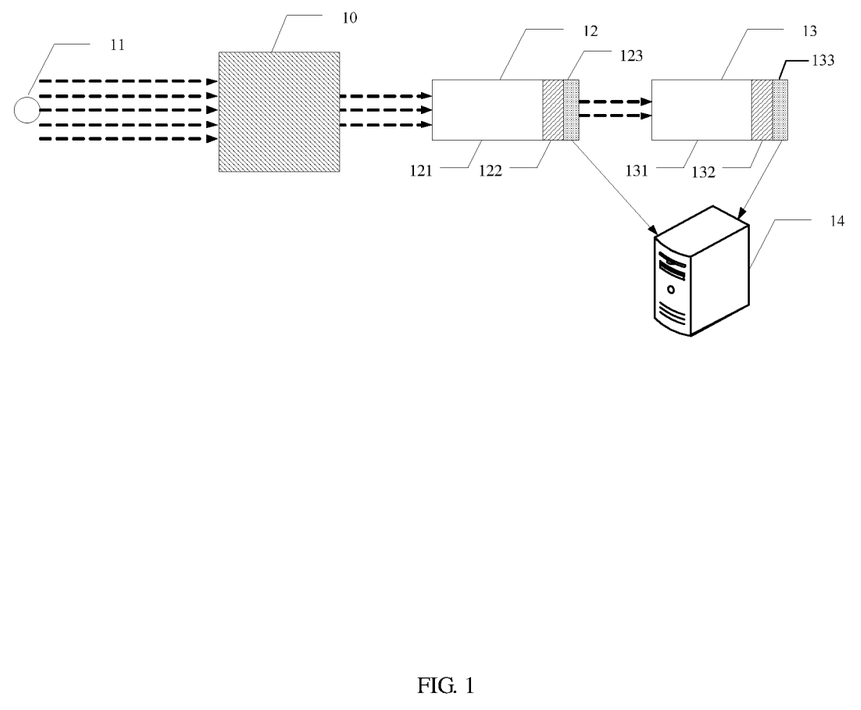
FIG. 1 is a schematic diagram illustrating a dual-energy detection apparatus in an exemplary embodiment of the present disclosure.

FIG. 1 is a schematic diagram illustrating a dual-energy detection apparatus in an exemplary embodiment of the present disclosure.

Referring to FIG. 1, the dual-energy detection apparatus 100 may include: an X-ray source 11, a scintillation detector 12, a Cherenkov detector 13 and a processor 14.

The X-ray source 11 is configured to send a first X-ray beam to the object to be measured 10.

The scintillation detector 12 is configured to work in an integration mode, and to receive a second X-ray beam penetrating through the object to be measured (that is, after the first X-ray beam passes through the object to be measured 10, it becomes the second X-ray beam) to generate a first electrical signal.

The Cherenkov detector 13 is configured to be located behind the scintillation detector 12, to work in a counting mode, and to receive a third X-ray beam penetrating through the scintillation detector 12 (that is, after the second X-ray beam passes through the scintillation detector 12, it becomes the third X-ray beam) to generate a second electrical signal.

The processor 14 is configured to output image, thickness and material information of the object to be measured according to the first electrical signal and the second electrical signal.

As shown in FIG. 1, the scintillation detector 12 is close to the object to be measured 10, and the Cherenkov detector 13 is located directly behind the scintillation detector 12. The scintillation detector 12 includes a scintillator 121, a photosensitive device 122 and a data readout circuit 123. The Cherenkov detector 13 includes a Cherenkov radiator 131, a photomultiplier device 132 and a fast readout circuit 133. The photomultiplier device 132 may be, for example, a photomultiplier tube, a silicon photomultiplier tube, etc.

The X-ray beam penetrating through the object to be measured 10 (the second X-ray beam) is incident into the scintillator (sensitive volume) 121 of the scintillation detector 12. A photosensitive device 122 (e.g., a photodiode) is coupled with the second X-ray beam, that is, it converts the scintillation light induced by the incident X-ray into an electrical signal and transmits it to the data readout circuit 123. The data readout circuit 123 works in the integration mode, and can read out the signal of the entire X-ray pulse beam without distinguishing the energy of each of the X-ray photons therein. That is, a plurality of the X-ray photons of the entire beam is detected as a collation, for outputting the first electric signal including image information of the object to be measured. The scintillation detector 12 works separately and does not need to adjust parameters to cooperate with the Cherenkov detector 13, which can remain compatible with conventional radiation inspection system, so as to perform traditional detection requirements.

The Cherenkov detector 13 receives X-ray that penetrates the scintillation detector 12 (the third X-ray beam, that is, after the second X-ray beam penetrates through the scintillation detector 12, it becomes the third X-ray beam). The photomultiplier device 132 reads out the Cherenkov radiation generated by each of the X-ray photons within the Cherenkov radiator 131. The fast readout circuit 133 is configured to work in the counting mode with a response time that is less than interval times between any two X-ray photons in the X-ray beams. The fast readout circuit 133 can read out the electrical signal that is produced by converting the Cherenkov radiation by the photomultiplier device 132, to generate an energy spectrum signal of the X-ray beam (the second electrical signal), which may include image, thickness and material information of the object to be measured. By analyzing the energy spectrum of the X-ray that is incident in the sensitive volume of the Cherenkov detector 13, the information such as image, material and thickness of the object to be measured can be acquired. The Cherenkov detector 13 works separately and does not need to adjust hardware parameters to cooperate with the scintillation detector 12, which can separately perform spectrum identification and output material discriminating information.

By making the scintillation detector 12 and the Cherenkov radiator 13 work separately, it is possible to avoid joint adjustment for system parameters, reduce the difficulty of use, seamlessly couple with present systems, and improve market acceptance.

In the structure shown in FIG. 1, the scintillation detector 12 is responsible for completion of the traditional inspection, and the Cherenkov radiator 13 is configured for a supplement to enhance the substance identification effect. The intensity of the third X-ray beam incident into the Cherenkov detector 13 has a large attenuation relative to the intensity of the second X-ray beam incident into the scintillation detector 12. Due to the natural threshold characteristic of the Cherenkov detector, the X-ray below certain energy is hard to generate signal in the Cherenkov detector, which can avoid the interference caused by low-energy X-ray. In this way, the preceding scintillation detector can complete basic detection functions and maintain compatibility with the present systems, and the post Cherenkov detector shields low-energy X-ray photons by utilizing the threshold, thus the ability of the overall dual-energy detector for discriminating X-ray photons is improved.

At the same time, because the speed of Cherenkov radiation is fast, it can satisfy the requirement for measuring the energy spectrum of high-density X-ray, which can make up for the drawback that the scintillation detector cannot perform energy spectrum measurement of high counting rate. Although the radiation light yield in the sensitive volume of the scintillation detector is low, by cooperating with high-gain optoelectronic components (such as silicon photomultipliers, whose gain multiple is more than $10^6$), this weakness can be well solved.

In an exemplary embodiment of the present disclosure, the processor 14 may be configured to acquire the image of the object to be measured based on the first electrical signal and the second electrical signal, and acquire the thickness and material information of the object to be measured based on the second electrical signal.

Based on the image of the object to be measured identified by the separately-working scintillation detector, and the image, thickness and material information of the object to be measured identified by the separately-working Cherenkov detector, it may acquire images with more details, enhance the material identification ability, and improve penetration index.

The manner of acquiring the image of the object to be measured may be, for example, by superimposing image data, then adding information for identifying thickness and material information on the image of the object to be measured, such as coloring, to generate clearer image that can display more information about the object to be measured.

Figure 2:
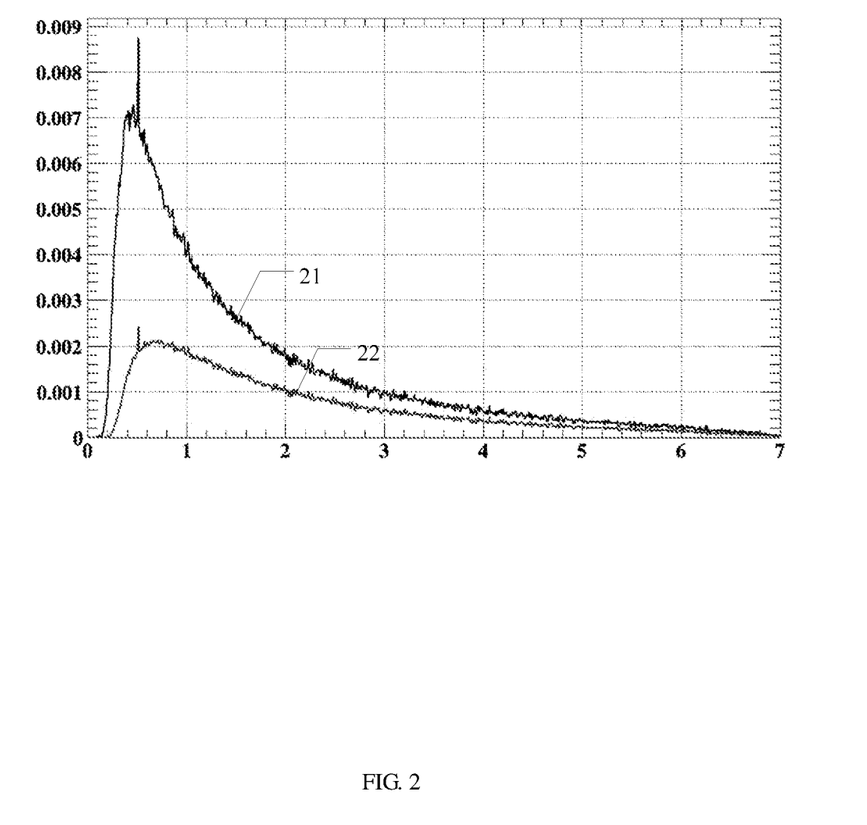
FIG. 2 is a schematic diagram illustrating an energy spectrum in an exemplary embodiment of the present disclosure.

FIG. 2 is a schematic diagram illustrating an energy spectrum in an exemplary embodiment of the present disclosure.

As shown in FIG. 2, Curve 21 is an X-ray energy spectrum generated by the bremsstrahlung emitted from a 7 MeV electron accelerator, and curve 22 is the energy spectrum after the bremsstrahlung penetrates through an object of CsI(Tl) material with a thickness of 30 mm By identifying the energy spectrum shown by the curve 22, information such as the image and the thickness of the object to be measured may be acquired.

Figure 3:
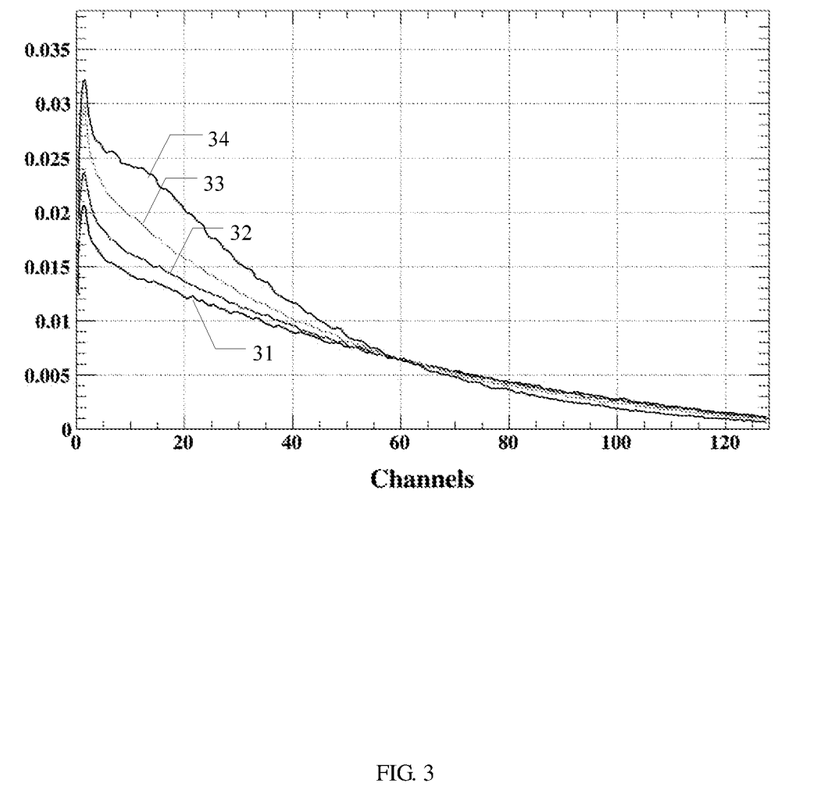
FIG. 3 is a schematic diagram illustrating different material energy spectrum at the same mass thickness acquired by a counting mode in a Cherenkov detector in an exemplary embodiment of the present disclosure.

FIG. 3 is a schematic diagram illustrating different material energy spectrum at the same mass thickness acquired by a counting mode in a Cherenkov detector in an exemplary embodiment of the present disclosure. In FIG. 3, energy spectrum of four substances is obtained by the Cherenkov detector.

Referring to FIG. 3, the X-ray may generate the energy spectrums shown as in the figure by the Cherenkov detector when it penetrates through the materials of carbon (curve 31), aluminum (curve 32), iron (curve 33) and lead (curve 34) respectively. By identifying the energy spectrums shown as the four curves, it is possible to accurately identify the information such as the material, etc., of the object to be measured.

In some embodiments, the fast readout circuit 133 is configured to receive the third X-ray beam and acquire the energy spectrum of the third X-ray beam, acquire a first integration of a first preset interval of the energy spectrum and a second integration of a second preset interval of the energy spectrum, and acquire the information such as the thickness and the material of the object to be measured according to the first integration and the second integration.

For example, with respect to any of the curves shown in FIG. 3, an integral value of the 80$^{th}$ to the 100$^{th}$ channels is taken as signal$_H$, and the integral value of the 10$^{th}$ to 40$^{th}$ channels is taken as signal$_L$. Then, a converted energy spectrum is calculated by the following formula:

$$\begin{cases} x = -100 \times \log_{10} signal_H \\ y = 100 \times \dfrac{signal_H}{signal_L} \end{cases} \quad (1)$$

Figure 4:
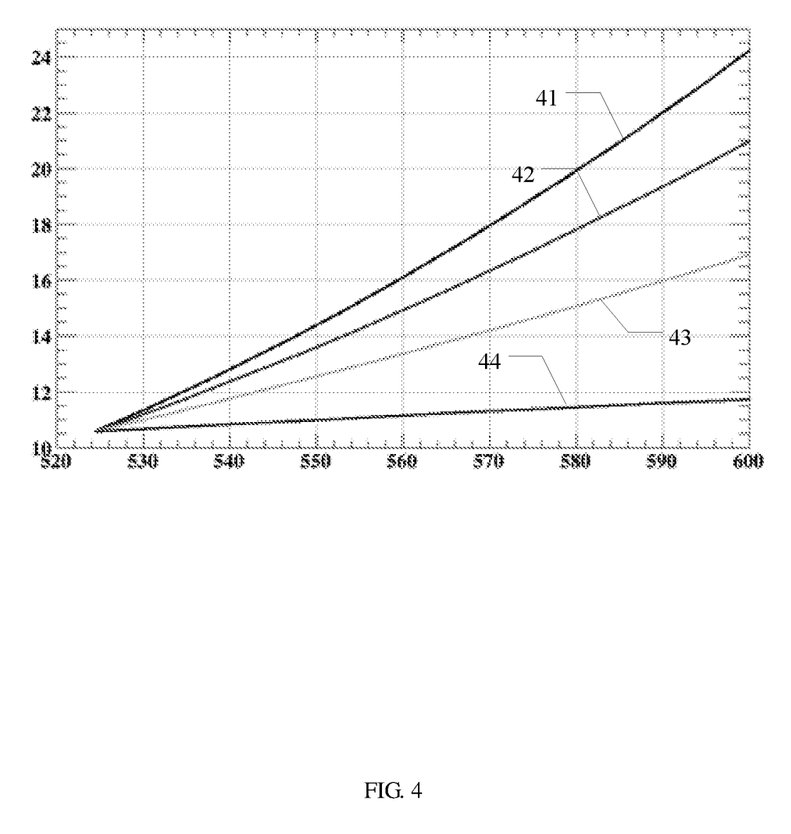
FIG. 4 is a schematic diagram illustrating different material curves acquired after data processing in an exemplary embodiment of the present disclosure.

FIG. 4 is a schematic diagram illustrating different material curves acquired after data processing in an exemplary embodiment of the present disclosure. In FIG. 4, the energy spectrum conversion curves of different materials are obtained according to formula (1).

Curve 41 represents "carbon substance", curve 42 represents "aluminum substance", curve 43 represents "iron substance", and curve 44 represents "lead substance". As shown in FIG. 4, the thickness of the substance increases as the increase of x value, and the material of the substance varies with the difference of y value. By calculating the (x,y) value of the energy spectrum of the third X-ray penetrating through the object to be measured 10 and the scintillation detector 12, the thickness information and the material information of the object to be measured may be acquired. Although this method is based on the presence of the scintillation detector, when structural information of the scintillation detector changes, hardware information such as structure and composition of the Cherenkov detector does not need to be changed, and it only needs to adjust algorithm parameters.

The values of the above integration areas are only an example, and those skilled in the art can set the integration areas by themselves according to the actual situations.

Figure 5:
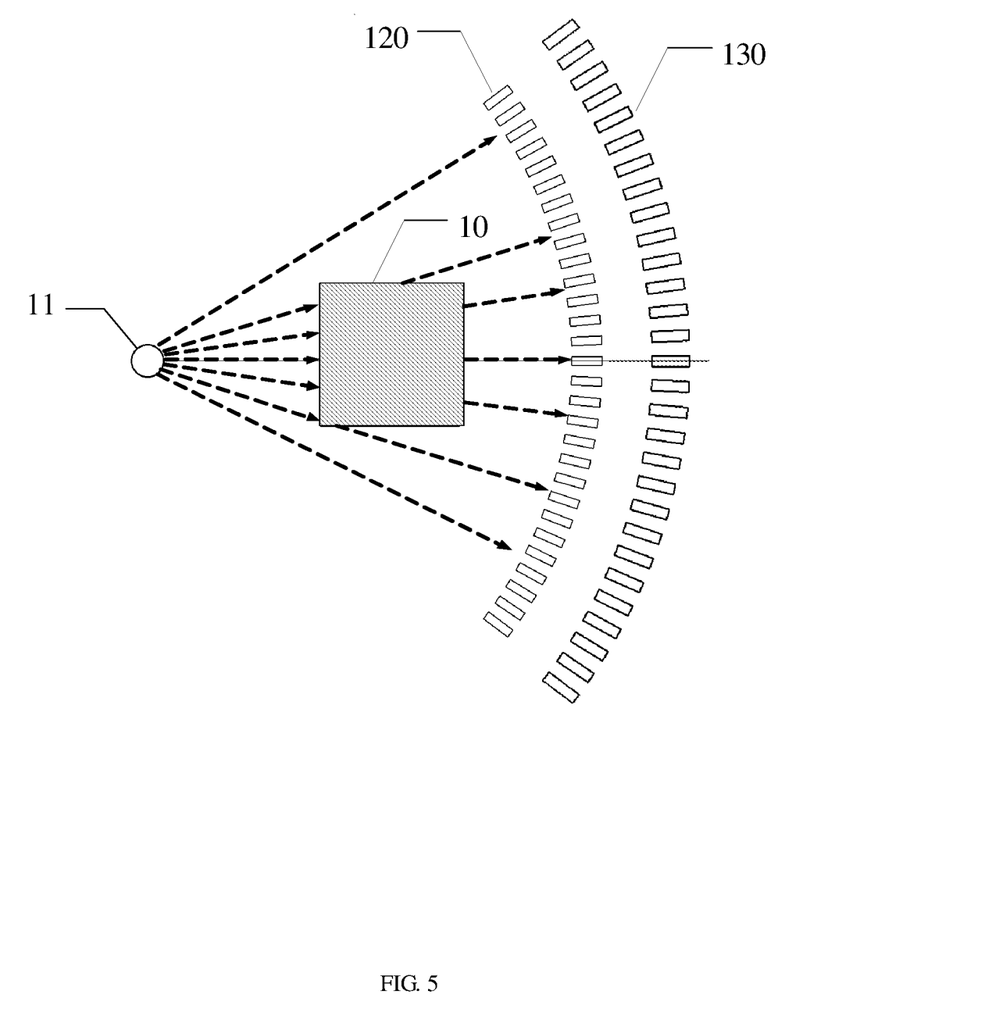
FIG. 5 is a schematic diagram illustrating an actual working condition of the dual-energy detection apparatus in an exemplary embodiment of the present disclosure.

FIG. 5 is a schematic diagram illustrating an actual working condition of the dual-energy detection apparatus in an exemplary embodiment of the present disclosure.

Referring to FIG. 5, in actual working, the scintillation detectors and the Cherenkov detectors typically work in a manner of arrays to acquire more comprehensive X-ray information. Therefore, in actual working, the X-ray source 11, a scintillation detector array 120 and a Cherenkov detector array 130 are arranged on two sides of the object to be measured 10. Each Cherenkov detector 13 in the Cherenkov detector array 130 corresponds to one scintillation detector 12 in the scintillation detector array 120 one by one.

Compared with the conventional dual-energy detector, the dual-energy detection apparatus of the present disclosure can adapt to high intensity, high density X-ray, has higher detection efficiency, and can output clearer images with more details of the object to be measured. In addition, by retaining the separately-working scintillation detector and Cherenkov detector, the usability and performance indicator completely cover the advantages of the detection method of integration mode in the prior art, and it needs no joint adjustment for the parameters of the detectors, so it is easier to be accepted by market.

Figure 6:
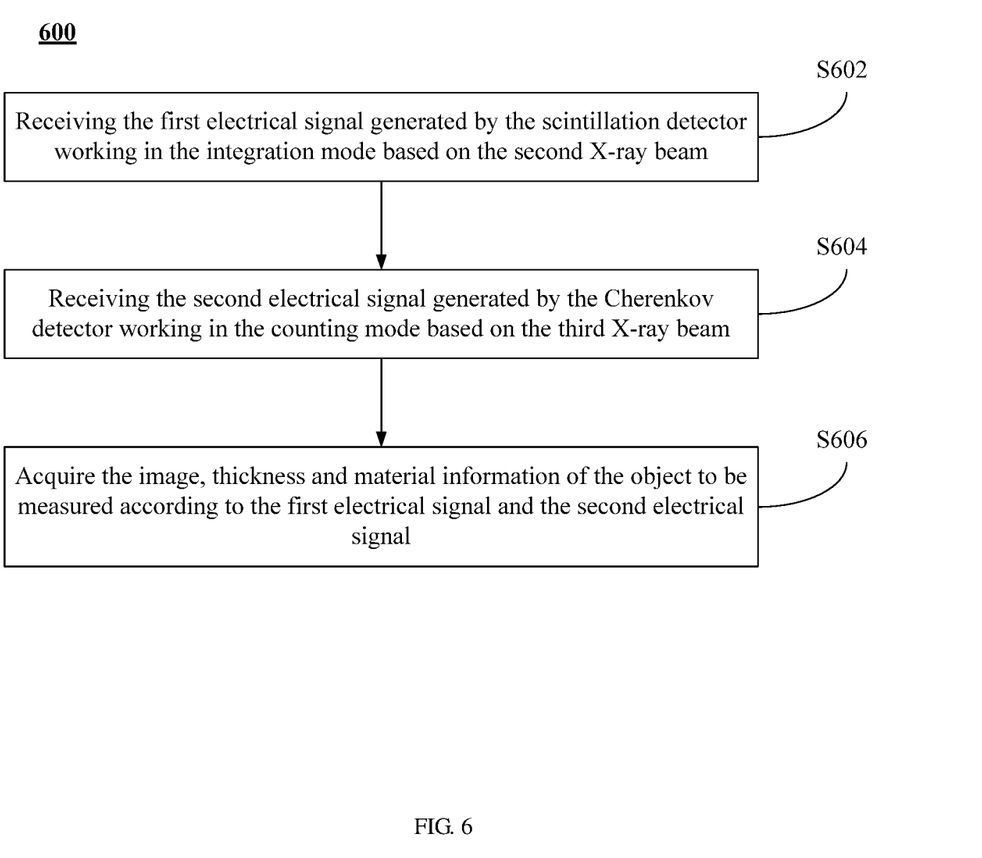
FIG. 6 is a schematic flow chart illustrating a dual-energy detection method in an exemplary embodiment of the present disclosure.

FIG. 6 is a schematic flow chart illustrating a dual-energy detection method in an exemplary embodiment of the present disclosure.

Referring to FIG. 6, a dual-energy detection method 600 of the present disclosure, which is applied to the above-mentioned dual-energy detection apparatus of the present disclosure, may include the following steps.

In step S602, the first electrical signal generated by the scintillation detector working in the integration mode based on the second X-ray beam is received, wherein the second X-ray beam is formed by the first X-ray beam penetrating through the object to be measured.

In step S604, the second electrical signal generated by the Cherenkov detector working in the counting mode based on the third X-ray beam is received, wherein the Cherenkov detector is located behind the scintillation detector, and the third X-ray beam is formed by the second X-ray beam penetrating through the scintillation detector.

In step S606, the image, thickness and material information of the object to be measured are acquired according to the first electrical signal and the second electrical signal.

In an exemplary embodiment of the present disclosure, the first electrical signal includes the image information of the object to be measured, and the second electrical signal includes the image, thickness and material information of the object to be measured.

In an exemplary embodiment of the present disclosure, acquiring the image, thickness and material information of the object to be measured according to the first electrical signal and the second electrical signal includes the following steps.

The image information of the object to be measured is acquired based on the first electrical signal and the second electrical signal.

The thickness and material information of the object to be measured are acquired based on the second electrical signal.

Figure 7:
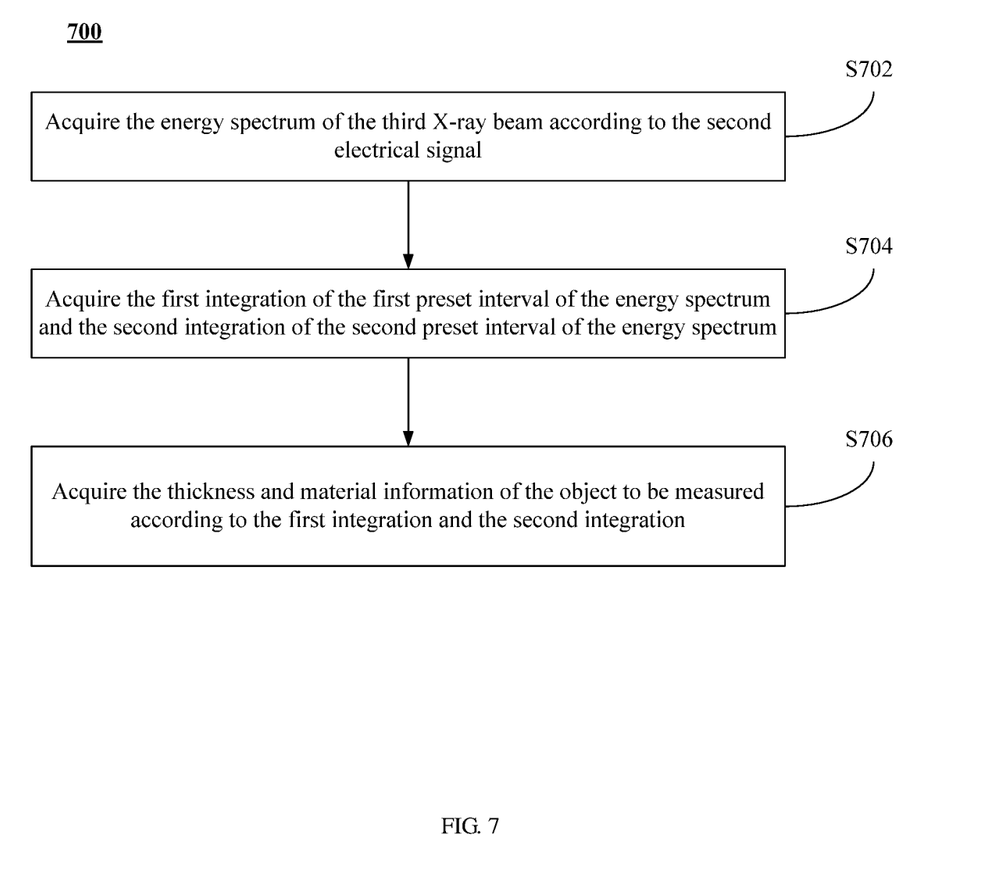
FIG. 7 is a schematic sub-flow chart illustrating a dual-energy detection method in an exemplary embodiment of the present disclosure.

FIG. 7 is a schematic sub-flow chart illustrating a dual-energy detection method in an exemplary embodiment of the present disclosure.

Referring to FIG. 7, in an exemplary embodiment of the present disclosure, acquiring the thickness and material information of the object to be measured based on the second electrical signal (step 700) may include the following steps.

In step S702, the energy spectrum of the third X-ray beam is acquired according to the second electrical signal.

In step S704, the first integration of the first preset interval of the energy spectrum and the second integration of the second preset interval of the energy spectrum are acquired.

In step S706, the thickness and material information of the object to be measured is acquired according to the first integration and the second integration.

Figure 8:
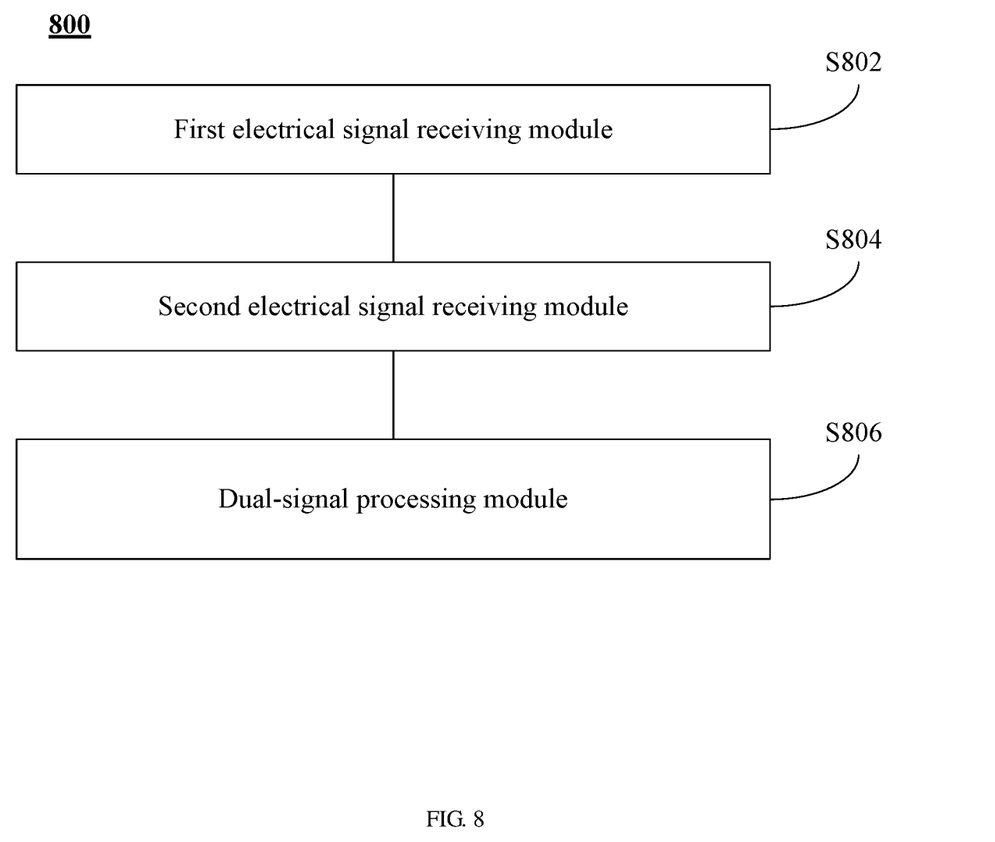
FIG. 8 is a schematic block diagram illustrating a dual-energy detection apparatus in an exemplary embodiment of the present disclosure.

FIG. 8 is a schematic block diagram illustrating a dual-energy detection apparatus in an exemplary embodiment of the present disclosure. Referring to FIG. 8, a dual-energy detection apparatus 800 of the present disclosure may include the following modules.

A first electrical signal receiving module 802 is configured to receive the first electrical signal generated by the scintillation detector working in the integration mode based on the second X-ray beam, wherein the second X-ray beam is formed by the first X-ray beam penetrating through the object to be measured.

A second electrical signal receiving module 804 is configured to receive the second electrical signal generated by the Cherenkov detector working in the counting mode based on the third X-ray beam, wherein the Cherenkov detector is located behind the scintillation detector, and the third X-ray beam is formed by the second X-ray beam penetrating through the scintillation detector.

A dual-signal processing module 806 is configured to acquire the image, thickness and material information of the object to be measured according to the first electrical signal and the second electrical signal.

Since the respective functions of the dual-energy detection apparatus 800 have been described in detail in the corresponding method embodiments, the disclosure will not repeat it herein. It should be noted that, although several modules or units of equipment for execution are mentioned in the above detailed description, such division is not mandatory. In fact, according to the embodiments of the present disclosure, features and functions of two or more of the modules or units described above may be implemented in one module or unit. Alternatively, the features and functions of one module or unit described above may be further divided into a plurality of modules or units.

In an exemplary embodiment of the present disclosure, an electronic device for implementing the above method is provided.

Those skilled in the art will appreciate that various aspects of the present disclosure may be implemented as a system, method or program product. Therefore, various aspects of the present disclosure may be specifically realized in form of a complete hardware implementation, a complete software implementation (including firmware, microcode, etc.), or a combination of hardware and software, which may be collectively referred to herein, "circuit", "module" or "system".

Figure 9:
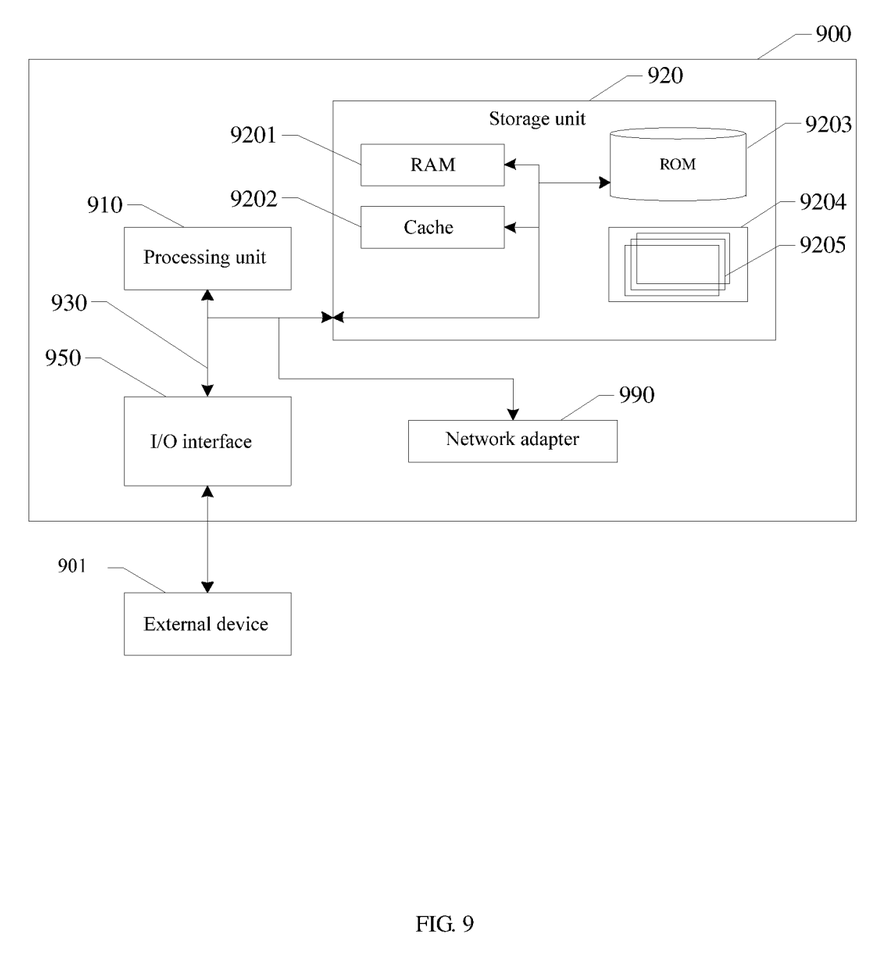
FIG. 9 is a schematic diagram illustrating a dual-energy detection apparatus in an exemplary embodiment of the present disclosure.

FIG. 9 is a schematic diagram illustrating a dual-energy detection apparatus in an exemplary embodiment of the present disclosure an electrical device 900 according to an embodiment of the present disclosure is described below with reference to FIG. 9. The electronic device 900 shown in FIG. 9 is merely an example and should not impose any limitation on the function and use scope of the embodiments of the present disclosure.

As shown in FIG. 9, the electronic device 900 is implemented in form of a general purpose computing device. The components of the electronic device 900 may include, but are not limited to, at least one processing unit 910, at least one storage unit 920, a bus 930 connecting different system components (including the storage unit 920 and the processing unit 910).

The storage unit stores program code that can be executed by the processing unit 910, such that the processing unit 910 performs the steps according to various exemplary embodiments of the present disclosure described in the "detailed description" section of the present specification. For example, the processing unit 910 may perform the dual-energy detection method as shown in FIG. 6. The first electrical signal generated by the scintillation detector working in the integration mode based on the second X-ray beam is received, wherein the second X-ray beam is formed by the first X-ray beam penetrating through the object to be measured. The second electrical signal generated by the Cherenkov detector working in the counting mode based on the third X-ray beam is received, wherein the Cherenkov detector is located behind the scintillation detector, and the third X-ray beam is formed by the second X-ray beam penetrating through the scintillation detector. The image, thickness and material information of the object to be measured are acquired according to the first electrical signal and the second electrical signal.

The storage unit 920 may include a readable medium in form of a volatile storage unit, such as a random access storage unit (RAM) 9201 and/or a cache 9202, and may further include a read only storage unit (ROM) 9203.

The storage unit 920 may further include a program/utility 9204 having a set (at least one) of program modules 9205, such program modules 9205 may include but not limited to: an operating system, one or more applications, other program modules and program data, and each of or some combination of the modules of these examples may include the implementations of network environment.

Bus 930 may one or more representative of several types of bus structures, including a memory unit bus or memory unit controller, a peripheral bus, a graphics acceleration port, a processing unit, or a local area bus using any of a variety of bus structures.

The electronic device 900 may communicate with one or more external devices 901 (e.g., a keyboard, pointing device, Bluetooth device, etc.), and may communicate with one or more devices that may enable a user to interact with the electronic device 900, and/or communicate with any device (e.g., router, modem, etc.) that enables the electronic device 900 to communication with one or more other computing devices. Such communication may take place via an input/output (I/O) interface 950. The electronic device 900 may further communicate with one or more networks (e.g., a local area network (LAN), a wide area network (WAN), and/or a public network, such as the Internet) through a network adapter 990. As shown, the network adapter 990 may communicate with other modules of the electronic device 900 via bus 930. It should be understood that, although not shown in the figures, other hardware and/or software modules may be utilized in conjunction with the electronic device 900, including but not limited to: microcode, device drivers, redundant processing units, external disk drive arrays, RAID (Redundant Array of Separate Disks) systems, tape drives and data backup storage systems, etc.

Through the description of the above embodiments, those skilled in the art will readily understand that the example embodiments described herein may be implemented by software or by software in combination with necessary hardware. Therefore, the technical solution according to an embodiment of the present disclosure may be embodied in form of a software product, which may be stored in a non-volatile storage medium (which may be a CD-ROM (Compact Disk-Read Only Memory), a USB (Universal Serial Bus) flash drive or a mobile hard disk, etc.) or on a network, include a number of instructions to cause a computing device (which may be a personal computer, server, terminal device or network device, etc.) to perform the method according to the embodiments of the present disclosure.

In an exemplary embodiment of the present disclosure, a computer readable storage medium is further provided, on which a program product is stored that is capable of implementing the above method of the present specification. In some possible implementations, respective aspects of the present disclosure may be implemented in form of a program product including program code, and when the program product runs on a terminal device, the program code causes the terminal device to perform the steps according to various exemplary embodiments of the present disclosure described in the "detailed description" section of the present specification.

Figure 10:
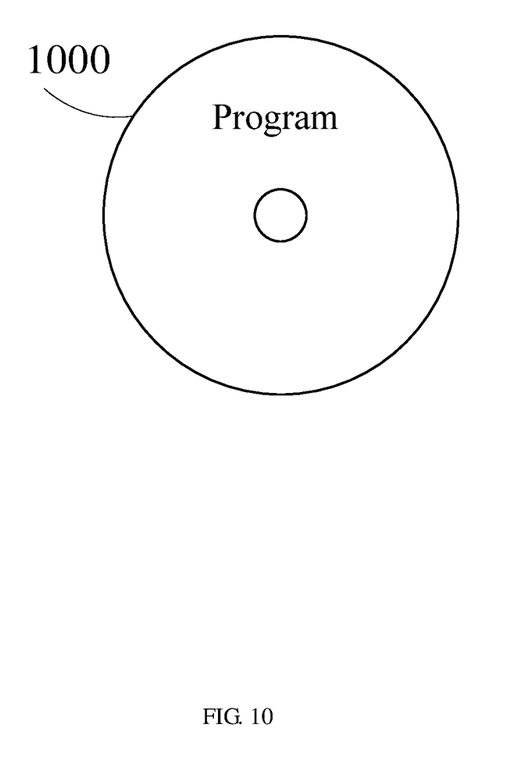
FIG. 10 is a schematic diagram illustrating a storage medium in an exemplary embodiment of the present disclosure.

FIG. 10 is a schematic diagram illustrating a storage medium in an exemplary embodiment of the present disclosure. Referring to FIG. 10, a program product 1000 for implementing the above method according to various exemplary embodiments of the present disclosure is illustrated, which may employ a portable compact disk read only memory (CD-ROM) and includes program code, and may run in a terminal device, for example on a personal computer. However, the program product of the present disclosure is not limited thereto, and in the present disclosure, the readable storage medium may be any tangible medium containing or storing a program that may be used by or in connection with an instruction execution system, apparatus or device.

The program product may employ any one or combination of more readable media. The readable medium may be a readable signal medium or a readable storage medium. The readable storage medium may be, for example, but not limited to, an electronic, magnetic, optical, electromagnetic, infrared, or semiconductor system, apparatus, or device, or any combination of the above. More specific examples (non-exhaustive lists) of readable storage media include: electrical connections with one or more wires, portable disks, hard disks, random access memory (RAM), read only memory (ROM), erasable Programmable read-only memory (EPROM or flash memory), optical fiber, portable compact disk read only memory (CD-ROM), optical storage device, magnetic storage device, or any suitable combination of the foregoing.

The computer readable signal medium may include data signal that is propagated in a baseband or as part of a carrier, carrying readable program code. Such propagated data signals may take a variety of forms including, but not limited to, electromagnetic signals, optical signals, or any suitable combination of the foregoing. The readable signal medium may be any readable medium other than a readable storage medium that may transmit, propagate or transport a program for use by or in connection with an instruction execution system, apparatus or device.

Program code included on a readable medium may be transmitted by any suitable medium, including but not limited to wireless, line, optical cable, RF (Radio Frequency), etc., or any suitable combination of the foregoing.

Program code for performing the operations of the present disclosure may be written in any combination of one or more programming languages, including an object oriented programming language such as Java, C++, etc., including conventional procedural programming language, such as the "C" language or a similar programming language. The program code may execute entirely on the user computing device, partially on the user device, as a stand-alone software package, partially on the remote computing device and partially on the user computing device, or entirely on the remote computing device or server. In the case of a remote computing device, the remote computing device may be connected to the user computing device via any kind of network, including a local area network (LAN) or a wide area network (WAN), or may be connected to an external computing device (e.g., connected via the Internet by utilizing an Internet service provider).

Further, the above-described drawings are merely illustrative of the processes included in the method according to the exemplary embodiments of the present disclosure, and are not intended to limit the present disclosure. It is easy to understand that the processing shown in the above figures does not indicate or limit the chronological order of these processes. In addition, it is easy to understand that these processes may be performed synchronously or asynchronously, for example, in a plurality of modules.

In an exemplary embodiment of the present disclosure, a computer readable storage medium is further provided, on which a program is stored, and when the program is executed by the processor, the dual-energy detection method as described in any of the above items is realized. The computer readable storage medium may be, for example, a temporary and non-temporary computer readable storage medium including instructions.

From consideration of the specification and practice of the present disclosure, those skilled in the art will easily think of other embodiments of the present disclosure. The present application is intended to cover any variations, uses, or adaptations of the present disclosure, which are in accordance with the general principles of the present disclosure and include common general knowledge or conventional technical means in the art that are not disclosed in the present disclosure. The specification and examples are to be regarded as illustrative only, and the true scope and spirit of the present disclosure are indicated by the following claims.

What is claimed is:

1. A dual-energy detection apparatus, comprising:
   an X-ray source, configured to send a first X-ray beam to an object to be measured;
   a scintillation detector, configured to work in an integration mode, and receive a second X-ray beam penetrating through the object to be measured to generate a first electrical signal;
   a Cherenkov detector, configured to be located behind the scintillation detector, work in a counting mode, and receive a third X-ray beam penetrating through the scintillation detector to generate a second electrical signal with; and
   a processor, configured to output image, thickness and material information of the object to be measured according to the first electrical signal and the second electrical signal.

2. The dual-energy detection apparatus according to claim 1, wherein the scintillation detector comprises:
   a scintillator;
   a photosensitive device; and
   a data readout circuit, configured to work in the integration mode, and output the first electrical signal comprising the image information of the object to be measured.

3. The dual-energy detection apparatus according to claim 1, wherein the Cherenkov detector comprises:
   a Cherenkov radiator;
   a photomultiplier device; and
   a fast readout circuit, configure to work in the counting mode, and output the second electrical signal comprising the image, thickness and material information of the object to be measured.

4. The dual-energy detection apparatus according to claim 3, wherein the fast readout circuit is configured to receive the third X-ray beam and acquire an energy spectrum of the third X-ray beam, acquire a first integration of a first preset interval of the energy spectrum and a second integration of a second preset interval of the energy spectrum, and acquire the thickness and material information of the object to be measured according to the first integration and the second integration.

5. The dual-energy detection apparatus according to claim 3, wherein the photomultiplier device comprises a photomultiplier tube or a silicon photomultiplier tube.

6. The dual-energy detection apparatus according to claim 1, wherein the processor acquires the image of the object to be measured based on the first electrical signal and the second electrical signal, and acquires the thickness and material information of the object to be measured based on the second electrical signal.

7. A dual-energy detection method, comprising:
   receiving a first electrical signal generated by a scintillation detector working in an integration mode based on a second X-ray beam, wherein the second X-ray beam is formed by a first X-ray beam penetrating through an object to be measured;
   receiving a second electrical signal generated by a Cherenkov detector working in a counting mode based on a third X-ray beam, wherein the Cherenkov detector is located behind the scintillation detector, and the third X-ray beam is formed by the second X-ray beam penetrating through the scintillation detector; and
   acquiring image, thickness and material information of the object to be measured according to the first electrical signal and the second electrical signal.

8. The dual-energy detection method according to claim 7, wherein the first electrical signal comprises the image information of the object to be measured, and the second electrical signal comprises the image, thickness and material information of the object to be measured.

9. The dual-energy detection method according to claim 7, wherein the step of
   acquiring image, thickness and material information of the object to be measured according to the first electrical signal and the second electrical signal comprises:
   acquiring the image information of the object to be measured based on the first electrical signal and the second electrical signal; and
   acquiring the thickness and material information of the object to be measured based on the second electrical signal.

10. The dual-energy detection method according to claim 9, wherein the step of acquiring the thickness and material information of the object to be measured based on the second electrical signal comprises:
    acquiring an energy spectrum of the third X-ray beam according to the second electrical signal;
    acquiring a first integration of a first preset interval of the energy spectrum and a second integration of a second preset interval of the energy spectrum; and
    acquiring the thickness and material information of the object to be measured according to the first integration and the second integration.

11. An electronic device, comprising:
    a memory; and
    a processor, configured to be coupled to the memory, and execute the method according to claim 7 based on instructions stored in the memory.

12. A non-transitory computer readable storage medium, on which a program is stored, and when the program is executed by a processor, a dual-energy detection method according to claim 7 is realized.

13. A dual-energy detection apparatus, comprising:
    a first electrical signal receiving module, configured to receive a first electrical signal generated by a scintillation detector working in an integration mode based on a second X-ray beam, wherein the second X-ray beam is formed by a first X-ray beam penetrating through an object to be measured;
    a second electrical signal receiving module, configured to receive a second electrical signal generated by a Cherenkov detector working in a counting mode based on a third X-ray beam, wherein the Cherenkov detector is located behind the scintillation detector, and the third X-ray beam is formed by the second X-ray beam penetrating through the scintillation detector; and
    a dual-signal processing module, configured to acquire image, thickness and material information of the object to be measured according to the first electrical signal and the second electrical signal.

* * * * *